United States Patent

[11] 3,626,028

| [72] | Inventor | Elmer J. De Witt<br>3154 Prior Drive, Cuyahoga Falls, Ohio 44223 |
|---|---|---|
| [21] | Appl. No. | 728,848 |
| [22] | Filed | May 13, 1968 |
| [45] | Patented | Dec. 7, 1971 |

[54] THERMOPLASTIC, RIGID RESINOUS COMPOSITION AND METHOD OF MAKING SAME
7 Claims, No Drawings

[52] U.S. Cl............................................. 260/878,
260/27, 260/32.8, 260/33.4, 260/33.6, 260/33.8, 260/45.75, 260/889, 260/897
[51] Int. Cl........................................................C08f 29/12, C08f 29/22
[50] Field of Search............................................ 260/878, 897 C

[56] References Cited
UNITED STATES PATENTS

| 2,956,042 | 10/1960 | Underwood et al. | 260/897 |
|---|---|---|---|
| 3,020,174 | 2/1962 | Natta et al. | 260/878 |
| 3,271,354 | 9/1966 | Weissert et al. | 260/897 |
| 3,347,956 | 10/1967 | Rademacher | 260/878 |
| 3,456,038 | 7/1969 | Newman et al. | 260/878 |

FOREIGN PATENTS

| 879,587 | 10/1961 | Great Britain |  |

*Primary Examiner*—Harry Wong, Jr.
*Attorneys*—R. W. Wilson and H. S. Meyer

ABSTRACT: A rigid, thermoplastic resinous blend comprises a rigid vinyl chloride base resin such as polyvinyl chloride and from about 0.5 percent to about 8 percent/wt., based on the weight of the base resin, of an amorphous, low molecular weight polypropylene. The blend has greatly improved melt flow properties and also a resistance to distortion by heat which is essentially equal to or superior to those of the base resin. The preferred method of making such a blend involves dissolving an amorphous polypropylene soluble in vinyl chloride in the base resin monomeric mixture and carrying out the polymerization thereof in aqueous suspension to produce a granular vinyl chloride resin in which the polypropylene, normally highly incompatible with vinyl chloride resins, is uniformly dispersed in a physical sense.

THERMOPLASTIC, RIGID RESINOUS COMPOSITION AND METHOD OF MAKING SAME

BACKGROUND OF THE INVENTION

The processing of rigid vinyl chloride resins is so difficult that it is usual practice to blend with the vinyl chloride base resin other resinous processing aids or additives having better flow characteristics or which have the ability to impart better flow properties to the blend. Likewise, since most rigid vinyl chloride resins tend to be brittle, it has become customary to blend a rubbery ingredient with the base resin to improve the impact resistance of the final blend. Sometimes, composite resinous/rubbery additives, for example a styrene/acrylonitrile copolymer resin over-polymerized or "grafted" on polybutadiene, which improve both flow properties and impact resistance are employed. However, with most known additives of either type, when a sufficient proportion of such additives for good flow properties is utilized some other important physical or chemical chemical property such as heat distortion characteristics or resistance to heat, chemicals or solvents, will have been impaired. As a result, it would be highly desirable to provide rigid vinyl chloride resin formulations having improved melt flow characteristics while retaining a maximum of the normally good physical and chemical properties inherent in the vinyl chloride base resin.

PRIOR ART

U.S. Pat. Nos. 3,163,683 and 3,312,756 disclose multicomponent blends of a vinyl chloride polymer and a hydrocarbon elastomer or resin such as polyethylene or polypropylene together with, as a third ingredient, an acrylonitrile-containing polymer. For example, the former patent discloses the use of a high molecular weight polyethylene as a means of reducing the plasticizing action of an acrylonitrile polymer, in this case an acrylonitrile-butadiene rubber (nitrile rubber), on the vinyl chloride resin. The latter patent discloses a blend of a vinyl chloride resin and a "non-polar hydrocarbon elastomer" such as polyethylene plus a styrene/acrylonitrile graft on a rubbery diene polymer as a "compatibilizer." While both prior art patents allege high impact strengths for their compositions, neither patent discloses or suggests what the melt flow properties, heat distortion characteristics, or the chemical, solvent and heat resistance properties of their products may be. In fact, both the wide range of proportions disclosed and the extremely high impact strengths (i.e. over 20 ft. lbs./inch) reported in these prior art patents indicate that truly rigid formulations were not the sought-after result. The hydrocarbon polymers disclosed in such patents are high in both molecular weight and crystallinity.

SUMMARY OF THE INVENTION

In accordance with the present invention, it has been discovered that a small amount of a low molecular weight, amorphous or atactic polypropylene having a (weight average) molecular weight below about 40,000 and fully soluble in monomeric vinyl chloride and other common solvents such as benzene, toluene, hexane, and other aliphatic and in aromatic hydrocarbons as well as in chlorinated hydrocarbons in general has a unique ability to improve the melt flow properties of a vinyl chloride resin such as polyvinyl chloride without substantial effect on any other desirable physical or chemical characteristic of the latter.

Also, in accordance with the present invention, it has been found that much of the improved melt flow properties of the blends of this invention will be lost if acrylic type and other resinous or rubbery processing aids and/or impact-improvers are employed in normal proportions and the blend is processed at normal mixing temperatures. It has been found that commercially available acrylonitrile/styrene copolymers, acrylonitrile/styrene/butadiene terpolymers, acrylonitrile/styrene copolymers "grafted" on polybutadiene, and polymerized alkyl acrylates have this effect. An explanation of this behavior is not readily apparent. The deleterious effects of these acrylic-type resinous and rubbery additives can be minimized, however, by keeping the proportion of such additives low and by employing a mixing temperature just slightly higher than is normal for the base resin in question. For example, while such additives conventionally are employed at a level of 5 to 15 parts/wt. per 100 parts/wt. of base resin, their use at the level of 1 to 4 parts/wt. per 100 parts/wt. of base resin provides formulations having both high melt flow rates, high HDT values and a good all around balance of other physical and chemical characteristics. Similarly, the presence of amorphous polypropylene in the mixture seems to require that the initial fluxing or fusing of the blend be effected at a temperature at least 10° to 20° F. higher than is otherwise optimum for the base vinyl chloride base resin employed. Once incorporated and thoroughly dispersed, the amorphous polypropylene seems to improve melt flow behavior at any subsequent processing temperature encountered.

Only a small proportion of the low molecular weight polypropylene is required in the blend. As little as about 0.5 percent/weight based on the weight of vinyl chloride base resin will effect a significant improvement in the melt flow rate over that of the base resin and also impart improved processing behavior. As the proportion of amorphous polypropylene in the formulation is increased in the range of from about 5 to about 8 parts/wt. for 100 parts by weight of base resin, the melt flow rate is very nearly directly proportional to the concentration of polypropylene. At levels above the 8 part/wt. level of polypropylene, however, degradation of tensile strength and other resin properties occurs. At levels of from about 1 to about 6 parts/wt. of polypropylene per 100 parts by weight of base resin, loss of such other resin properties does not occur or is minor and it is possible to obtain a reasonably wide variation in melt flow rate by simple adjustment of the polypropylene concentration in the mix.

The effect of the amorphous polypropylene ingredient in the blends of this invention is considerably greater than, for example, the incorporation of an equivalent amount of propylene into the vinyl chloride base resin by copolymerization. In addition, incorporation of amorphous polypropylene into blends with polyvinyl chloride produces blends having considerably higher heat distortion temperatures (HDT) and greater rigidity than vinyl chloride/propylene copolymers of corresponding propylene content. The incorporation of monomeric propylene into a vinyl chloride polymer by copolymerization by contrast with the procedure of this invention also suffers from low reaction rates and lower productivities due to the inhibiting effect of the propylene. Incorporation of an already-polymerized amorphous polypropylene during the polymerization of a monomeric material containing vinyl chloride is a procedure which, as is explained below, does not suffer from the latter disadvantage.

Incorporating the amorphous polypropylene ingredient by ordinary mechanical mixing is somewhat more difficult than if the polypropylene were already present in the base resin in disperse form. At low temperatures the polypropylene is sticky and somewhat difficult to handle. At elevated mixing temperatures, the separately-added polypropylene appears to cause slippage between the stock and the surfaces of the mixing equipment and the initial knitting or fusing of the stock is slow at first. Once the polypropylene is dispersed, the stock becomes very easy to process. The preferred method of this invention for incorporating the polypropylene ingredient is to predisperse the polypropylene in a vinyl chloride resin during polymerization. It has been found that amorphous polypropylenes below about 40,000 molecular weight (weight average) are fully soluble in monomeric vinyl chloride in rather substantial concentrations of up to 20 to 25 percent/weight. Surprisingly, its presence in the monomeric vinyl chloride is without any discernible effect on polymerization when carried out in the normal manner in aqueous suspension. Even though apparently completely immiscible with vinyl chloride resins, the polypropylene is present in the granular vinyl chloride resin polymerization product in a completely occluded condition and sufficiently well-dispersed as to easily disperse in the final rigid blend during ordinary mixing or processing thereof.

Due to the inertness of the polypropylene during polymerization, it is possible to incorporate considerably higher proportions than is easily incorporated by mechanical mixing or than is required in a blend of this invention. At such higher proportions, the granular resin product containing polypropylene can be diluted with other vinyl chloride resins not containing polypropylene to arrive at the polypropylene level desired in the final blend. In this fashion, it is possible to produce a masterbatch of polypropylene in a vinyl chloride resin containing up to about 25 percent/weight of polypropylene. No evidence of chemical interaction or grafting between the polypropylene and the host vinyl chloride resin has been noted. In fact, the polymerization product containing polypropylene can be separated into resin and polypropylene by solvent extraction procedures.

VINYL CHLORIDE BASE RESIN

In the blends of this invention, any vinyl chloride resin may be employed which is prepared by the polymerization of a monovinylidene monomeric material (i.e. material consisting of monomers having a single $CH{=}C{<}$ group per molecule) containing at least 90 percent/weight of vinyl chloride, more preferably at least 95 percent/weight of vinyl chloride, and most preferably 100 percent/weight of vinyl chloride. The vinyl chloride resin should have a moderately high molecular weight equivalent to that of a polyvinyl chloride having an inherent viscosity, as determined according to ASTM D-1243 employing 0.2 gram of resin 100 ml. of cyclohexanone at 30° C., of at least about 0.50 dl./gram and on up to about 1.4 dl./gram. Due to the high processing temperatures (often 400° to 440° F.) employed in rigid resin processing, the vinyl chloride base resin should be stable and of high quality. Most preferably, the vinyl chloride base resin should be an easy-processing variety of granular, porous resins containing from about 5 percent to about 50 percent/volume of pore space and made up of granular particles at least 90 percent/weight of which are in the range of from about 200 to about 5 microns in diameter.

Copolymers and other multicomponent interpolymers of vinyl chloride prepared from monomeric materials containing up to 10 percent/weight of one of more other monovinylidene monomers may be employed as the base resin in the blends of this invention. Such other monovinylidene monomers may include styrene, acrylonitrile, vinylidene chloride, 1-olefins such as ethylene, propylene, 1-butene, 1-hexene and others, and the like. Among the copolymer base resins most preferred are vinyl chloride/propylene copolymers prepared from monomeric materials consisting of from about 90 percent to about 99 percent/weight of vinyl chloride and from about 1 percent to about 10 percent/weight of monomeric propylene. Such copolymers will usually contain from about 1 percent to about 7 percent/weight of chemically-combined or copolymerized propylene. Blends of this invention based on the copolymer resins show a considerable but less dramatic improvement in melt flow properties as compared to those shown by polyvinyl chloride. However, it has been demonstrated that the use in blends with amorphous polypropylene of vinyl chloride/propylene copolymers containing from about 1 percent to about 4 percent/weight of combined propylene provide high melt flow compositions at lower cost and having better properties than unmodified copolymers at the high end of the range of combined propylene.

AMORPHOUS POLYPROPYLENE INGREDIENT

The polypropylene for use in the blends of this invention is a material of random or disordered internal structure, of a low molecular about 4,500) and a wide distribution (weight average molecular weight below about 40,000 number average molecular weight below about 4,500) and a wide distribution in molecular weight (as indicated by wide spread between the number average and weight average molecular weights). The material should have, on the low end of the range, sufficient molecular weight (i.e. at least about 15,000, weight average) as to be a solid at service temperatures in the range of about 70° to about 200° F.

As indicated the polypropylene ingredient of this invention should be amorphous and by this is meant a material containing not more than about 30 percent/weight of crystalline polypropylene, more preferably not more than about 20 percent/weight. Such materials dissolve quite readily in common solvents and especially in chlorinated hydrocarbon solvents such as carbon tetrachloride or vinyl chloride albeit the resultant solution may appear to be turbid or cloudy due to undissolved crystallites. Such materials are nearly water-white in color; will soften in the range of from about 70° to about 95° C.; exhibit a brittle point not above about 0° C.; and will suffer at least some plastic flow at room temperatures. Materials of this description are not a true elastomeric substance and appear to be a soft, rubbery or waxlike putty in consistency.

The polypropylene ingredient for use in the blends of this invention is preferably employed in a disintegrated or crumblike form since it will disperse more readily in this form in a granular resin mix and dissolve more readily in vinyl chloride than the solid, sheet-or chunk-form of the material.

Amorphous polypropylenes of this description are obtainable in the manufacture of crystalline polypropylenes wherein the amorphous material is present in small quantities in the polymerization products and can be separated therefrom by solvent extraction. When such is the source, the residues of Ziegler-type of metal alkyl/transition metal polymerization catalysts should be removed to produce a water-white material low in metal residues for best stability in the blend.

BLEND COMPOSITION

As indicated previously, the blend should comprise, for every 100 parts/wt. of the vinyl chloride base resin, from about 0.5 to about 8 parts by weight of the amorphous polypropylene ingredient. Best results usually are obtained with from about 1 to about 6, most preferably from about 1 to about 4 parts/wt. of polypropylene per 100 parts/wt. of base resin.

Except for the necessity to keep the proportion of polymeric processing aids and impact improvers low, as indicated previously, the blends of this invention may otherwise be compounded or formulated according to usual practices. For example, auxiliary lubricants such as waxes or calcium stearate, stabilizers, antioxidants, antistatic agents, fillers, colorants, pigments, and the like may be employed according to normal practices. In general, as is usual in rigid formulations, the level of total additives is best kept low for best rigid properties.

BLEND PREPARATION

The blends of this invention are prepared by mechanical mixing employing high-shear and high temperatures. Such mixing may be carried out on two-roll differential plastic mills, in Banbury or other internal-type mixers, in the barrel of extruders or of screw-fed injection molding machines, and the like. A preferred procedure is to premix the granular base resin or resins with the polypropylene ingredient, with or without other granular or powdery ingredients, in a powder blender to produce a powdered preblend or in a Banbury-type internal mixer to produce masticated premix after either of which the powdered preblend (or masticated premix) is transferred to a two-roll differential plastics mill and the mixing continued. The milled stock is then sheeted off or cut into strips which can be employed in molding or which can be fed to a disintegrator or to an extruder fitted with a cutter-type die to produce a cubed or otherwise diced type of product. The powder-style of preblend can be fed directly to extruders and injection molding machines which can be operated so as to expend the required amount of work on the charge during its operation.

The blends of this invention process at temperatures normal for the vinyl chloride base resin employed, namely, from about 325° to about 420° F. For blends based on polyvinyl chloride, preferred processing temperatures will range from about 375° to about 420° F. and most preferred from about 380° to about 400° F. For copolymer-type vinyl chloride base resins, slightly lower processing temperatures in the range from about 335° to about 385° F. are preferred. At the lower end of these ranges of processing temperature, the presence of the polypropylene as a separate ingredient may somewhat prolong the period for the stock to knit or "make-up" into a sheet on the two-roll differential plastics mill. Once dispersion of the amorphous polypropylene has occurred, however, the stock evidences high lubricity and smoothness such that subsequent processing is much facilitated. Once thoroughly fused and fluxed, the blend acquires the desired high melt flow characteristics and it will extrude at high rates with good surface finish. The temperatures of processing are given here in terms of the temperature of the metal surfaces of processing equipment in contact with the stock. Stock temperatures can be somewhat higher due to heat buildup.

High-shear mixing at high temperatures is required for the blend to develop optimum properties. It is difficult to specify the exact shear levels required. However, a two-roll differential plastics mill having 4-inch oil-heated rolls maintained at 380° to 400° F. provides excellent mixing of blends based on polyvinyl chloride. Larger mills having 6-inch rolls usually show equivalent mixing at 350° F. At the 4–8 part/wt. levels of polypropylene, mill roll temperatures of 380°–400° F. appear to be required on either size machine.

The preferred method of preparing the blends of this invention is carried out by dissolving from about 0.5 percent to about 25 percent/weight more preferably from about 2 to about 20 percent/weight of the amorphous polypropylene in monomeric vinyl chloride and then employing the resulting monomeric solution as the source of monomeric vinyl chloride in an aqueous suspension polymerization carried out in a normal fashion. Such a polymerization is carried out by adding the monomer solution to a closed vessel containing water, a colloidally-active suspending agent such as methyl cellulose, polyvinyl alcohol, gelatin, bentonite clay and the like, and a peroxygen compound as a catalyst, such as any of the organic peroxides, hydroperoxides, peroxy-carbonates and the like, preferably one of the oil- or monomer-soluble peroxides such as caprylyl peroxide, benzoyl peroxide, isopropyl peroxy-dicarbonate and others. Such a reaction mixture is agitated and the temperature maintained in the range of about 0° to about 75° C., more preferably between about 15° and about 60° C. The reaction is vigorous and produces a good yield in 24 hours or less. The product is a slurry of granular polymer which is worked up in a conventional manner by venting unreacted monomer, filtering, washing and drying. When dry, the granular polymer usually can not be distinguished by the naked eye from the corresponding resin made without the polypropylene.

Such a product containing only from about 0.5 to about 6 percent/weight of amorphous polypropylene can be employed directly in compounding a resin formulation. Products containing greater amounts of the amorphous polypropylene require dilution with polypropylene-free resin or resins of lower polypropylene content so as to arrive at the level of polypropylene desired in the final blend.

The granular polymerization product is in a physical form admirably adapted to powder blending operations whereby such product is powder blended with or without dilution resins and with or without all the other compounding ingredients to form a very uniform powder preblend. Such preblend can be fused and fluxed under high shear on a two-roll differential plastics mill or in a Banbury mixer, or fed directly to an extruder or to an injection molding machine where it receives the necessary mechanical working coincident with the final shaping operation. In any of these operations it is noted that the batch "makes up" or knits much more readily than if the polypropylene were present as a separate ingredient. Milling times and mixing cycles are shorter and extrusion rates are, as are demonstrated in the examples below, much higher with the blends of this invention based on the resin/polypropylene composite additive than with prior art materials. The finish of final articles is much smoother than with compounds not containing amorphous polypropylene.

The invention will now be described with reference to several specific examples which are intended as being illustrative only and not as limiting the invention.

EXAMPLE 1

In this example, blends are prepared from (1) a commercially available, easy-processing grade of polyvinyl chloride sold under the trade name "Geon 101 EP" by B. F. Goodrich Chemical Company, this material having a moderately high molecular weight as evidenced by an inherent viscosity of 1.12 dl./gram (expressed as deciliters/gram; as determined at 30° C. by the procedure of ASTM D–1243 employing 0.2 gram of polymer dissolved in 100 ml. of cyclohexanone; all other inherent viscosities of vinyl chloride base resins herein being so determined) and (2) an amorphous or atactic polypropylene having the following physical and chemical characteristics:

| | |
|---|---|
| Crystallinity (by X-ray) | 10% to 20% |
| Inherent Viscosity | |
| (0.4%/wt. in toluene at 30° C.) | 0.20 |
| Molecular Weight | |
| Number average | 3,800 |
| Weight average | 26,100 |
| Solubility | |
| Toluene | hazy solution at 23° C |
| Pentane | 90% |
| Methanol | |
| Ethanol | Slightly |
| Acetone | |
| Methyl ethyl ketone | |
| Specific Gravity | 0.86 grams/cc at 25° C |
| Plastic Flow | |
| inches/30 sec. at 77° F. | |
| at 500 p.s.i. | 0.5–1.5 |
| Brittle Point | 7° F. (−14° C.) |
| Color | White |

In the blends of this example, the polypropylene is incorporated by two different methods. In several of the experimental blends it is added as small, rubbery crumblike particles and incorporation is accomplished by mechanical mixing on a two-roll differential plastics mill having 6-inch oil-heated rolls maintained at 350° F. In the remainder of the experimental blends, the polypropylene is added as predispersed products produced, as described in example 2, by polymerizing in aqueous suspension a solution of the polypropylene in monomeric vinyl chloride. Each experimental composition is first prepared as a powder preblend by mixing all ingredients in a high-shear internal blender before being transferred to the mill rolls. Mill mixing is continued for 6 minutes, at 350° F. after the stock forms a band on the back roll. Every blend so prepared contains, in addition to the ingredients listed below, 4.4 grams of dibutyl tin dithioglycollate stabilizer and 2.2 grams of calcium stearate lubricant.

The composition of the blends in grams is otherwise as follows:

| Sample No. | "Geon 101 EP," grams | Amorphous polypropylene Grams | PHR [1] | Pre-dispersed product, grams | Rutile $TiO_2$ pigment, grams |
|---|---|---|---|---|---|
| 895-1 | 220 | 8.8 | 4.0 | | 11 |
| 895-2 | 220 | 8.8 | 4.0 | | 22 |
| 895-3 | 220 | 11.0 | 5.0 | | 22 |
| 895-4 | 80 | | 4.2 | [2] 140 | 22 |
| 895-5 | | | 0.6 | [3] 220 | 22 |
| 895-6 | 220 | | | | 22 |

[1] Parts/wt. per 100 parts/wt. of resin ("Geon 101 EP").
[2] 6.3%/wt. of polypropylene, see Ex. 2 below.
[3] 0.65%/wt. of polypropylene, see Ex. 2 below.

The resulting blends are molded into standard ASTM tensile test sheets and the resulting sheets tested on an Instron tensile tester to measure tensile strength at both the yield and break points and elongation at break. In addition, a separate portion is evaluated for Melt Flow Rate ("MFR") by a proprietary test employing a constant-load rheometer, a 4 gram sample, a constant barrel temperature of 180° C., a constant load of 400 lbs. (2,000 p.s.i.) and a circular die of 0.0459 inch in diameter and 0.3260 inch in length (L/D=7/1). The amount of extrudate in 10 minutes under these conditions, in grams/10 min. is taken as the Melt Flow Rate (referred to below as "MFR"). The data are as follows:

| Sample No. | MFR [1] | Polypropylene, PHR | Tensile strength (p.s.i.) Yield | Tensile strength (p.s.i.) Break | Percent elong. at break |
|---|---|---|---|---|---|
| 895-1 | 42 | 4 | 5,920 | 6,360 | 216 |
| 895-2 | 58 | 4 | 5,670 | 5,620 | 171 |
| 895-3 | 72 | 5 | 5,500 | 5,090 | 128 |
| 895-4 | 65 | 4.2 | 5,620 | 5,570 | 173 |
| 895-5 | 3.8-5.2 | 1.4 | 6,580 | 7,480 | 245 |
| 895-6 | 0.5 | 0 | 6,850 | 8,120 | 240 |

[1] Grams/10 minutes.

All of the extrudates obtained, except the control 895-6 were smooth and apparently well-knit. Note the extraordinarily high MFR values for samples containing 4 to 5 PHR of the amorphous polypropylene. These MFR values approach or exceed those obtainable only with some of the softer, internally plasticized or nonrigid copolymer resins. As will be demonstrated in subsequent examples, melt flow behavior in this range is obtainable with no significant change in heat distortion temperature or heat deformation temperature ("HDT" in ° C., as determined according to the procedure of ASTM D-648 at 264 p.s.i.).

EXAMPLE 2

In this example, the same amorphous polypropylene employed in the formulations of example 1 is predispersed by the preferred polymerization procedure. A sealed metal autoclave having an agitator and a means of temperature control is employed as the reaction vessel. The vessel is purged of oxygen and the materials below added in the order listed.

| Material | Parts/wt. Parts/vol. |
|---|---|
| Water | 1,000 ml. |
| $K_3PO_4$ | 0.2 gram |
| Polyvinyl alcohol (2% in $H_2O$) | 30 ml. |
| Polypropylene—3 grams Vinyl Chloride—500 grams | premixed |
| Isopropyl peroxy-dicarbonate (10% Sol. in hexane) | 4 ml. |

The premixed solution of polypropylene in vinyl chloride is batch-charged and the reaction mixture agitated at 50° C. for 7 hours at which time the pressure has fallen from a high of 105 p.s.i. to 46 p.s.i. The excess vinyl chloride is vented off and the contents of the vessel discharged into a filter. The product is an easily filtered suspension of macrogranular resin which is indistinguishable by the naked eye from a similar polyvinyl chloride made without polypropylene. The filter cake is washed briefly with methanol to remove water and then dried in a vacuum oven at 50° C. to obtain a yield of 459 grams of dried product. The latter is found on analysis to contain 0.653 percent/weight of polypropylene; an inherent viscosity (expressed as deciliters/gram as determined employing 0.2 grams of resin at 30° C. in 50 ml. of cyclohexanone) of 0.993 dl./gram, and a density (25° C.) of 1.3927 grams/cc. The same procedure and materials, except for the use of 10 times the polypropylene concentration (30 grams) is employed to obtain a yield of 475 grams of a second, similar product containing 6.31 percent/weight of polypropylene and having an inherent viscosity of 0.968 dl./gram and a density (25° C.) of 1.3441 grams/cc. These products are shown in example 1 to be useful, either per se, or when diluted with polyvinyl chloride not containing polypropylene.

EXAMPLE 3

In this example, the blends of this invention are compared to similar formulations containing known hydrocarbon-type lubricants such as paraffin-based mineral oil and a petroleum-type wax known as "Hi-Wax 125."

In this series of experiments, the base resin is a commercially available polyvinyl chloride having an inherent viscosity of about 0.65 dl./gram. In addition to the materials listed below, each blend contains 100 PHR of the polyvinyl chloride, 1.5 PHR of dibutyl tin dithioglycollate stabilizer, and 1 PHR of "Hycar 2301×36" processing aid (a high molecular weight styrene/acrylonitrile copolymer made by B. F. Goodrich Chemical Company). Each blend shown below is prepared by powder premixing followed by milling for 4 minutes at 380° F. on a 6-inch plastics mill. The data are as follows:

| Sample No. | PHR Calcium stearate | PHR Mineral oil | PHR Amorphous polypropylene | PHR "Hi-Wax 125" | HDT, ° C. | 180° C. MFR, gms./10 min. |
|---|---|---|---|---|---|---|
| 1119-1 | 0 | 0 | 0 | 0 | 69.5 | 0.11 |
| 1119-2 | 1 | | | | 70.5 | 0.29 |
| 1119-3 | 2 | | | | 69.5 | 0.52 |
| 1119-4 | 4 | | | | 70.0 | 0.64 |
| 1119-5 | 6 | | | | 68.5 | 1.5 |
| 1119-6 | | 2 | | | 65.5 | 0.4 |
| 1119-7 | | 4 | | | 65.5 | 1.5 |
| 1119-8 | | 6 | | | 66.0 | 3.1 |
| 1119-9 | | | 2 | | 65.0 | 0.3 |
| 1119-10 | | | 4 | | 64.5 | 1.7 |
| 1119-11 | | | 6 | | 66.0 | 5.5 |
| 677-1 | | | 2 | | 72.5 | 17.5 |
| 677-2 | | | 1 | | 73.0 | 7.9 |
| 677-3 | | | 0.5 | | 73.0 | 7.4 |
| 1064-6 [1] | | | 3 | | (2) | 15.5 |
| 1064-7 | | | 4 | | | 28.0 |
| 1064-8 | | | 5 | | | 45.0 |
| 1064-9 | | | 6 | | | 93.0 |

[1] Prepared using a pre-dispersed polyvinyl chloride polymerization product containing 8.85% of the polypropylene of Ex. 1.
[2] Blanks indicate no determination.

It is clear that among the above hydrocarbon materials, all characterized by such common properties as a paraffinic nature, low melting point and a low molecular weight, the amorphous polypropylene is unique in its ability to very greatly increase melt flow without substantial effect on the HDT characteristics (in fact, HDT sometimes appears slightly higher with polypropylene). Amorphous, low molecular weight polypropylene is the only known low molecular weight material found to be essentially without effect on HDT of vinyl chloride resins. The reason for this distinctly different behavior of the amorphous polypropylene is not known.

EXAMPLE 4

The comparison of example 3, namely, comparing amorphous polypropylene to other processing aids, is carried one step further in this example wherein the effect of amorphous polypropylene on polyvinyl chloride containing various acrylic type processing aids and/or impact-improvers is determined. One of the latter materials is "Blendex 401," made by Rohm and Haas and said to be a styrene/acrylonitrile copolymer "grafted" on polybutadiene; another is "Hycar 2301×36," see foregoing examples; and the third such material is "Hycar 1010×43" a terpolymer rubber of butadiene/styrene and acrylonitrile. The base vinyl chloride resin is a commercially available easy-processing grade of polyvinyl chloride known as "Geon 103 EP" made by the B. F. Goodrich Chemical Company having an inherent viscosity of 0.94 dl./gram. In these examples, MFR, HDT and Izod impact values (as determined by ASTM D-256-56, Method A) are compared. The blends are prepared as in the foregoing examples by mill mixing for 4 minutes at 400° F. Each blend contains, in addition to the materials listed, 1.5 PHR of dibutyl tin dithioglycollate stabilizer. The data are as follows:

| Sample No. | Composition, PHR [1] | | | | | |
|---|---|---|---|---|---|---|
| | "Geon 103EP" | Amorphous [2] polypropylene | "Hycar 1010X43" | "Hycar 2301X36" | "Blendex 401" | TiO$_2$ pigment |
| 1399-1 | 100 | 3 | | | | 10 |
| 1399-2 | 100 | 3 | | 1 | | 10 |
| 1399-3 | 100 | 3 | | 3 | | 10 |
| 1399-4 | 100 | 3 | | 4 | | 10 |
| 1399-5 | 100 | 3 | 3 | | | 10 |
| 1399-6 | 100 | 3 | 5 | | | 10 |
| 1399-7 | 100 | 3 | 10 | | | 10 |
| 1399-8 | 100 | 3 | | | 3 | 10 |
| 1399-9 | 100 | 3 | | | 5 | 10 |
| 1405-7 | 100 | 2 | | | 10 | 10 |
| 1399-11 | 100 | | | | | 10 |

[1] Parts by weight per hundred parts by weight base resin.
[2] Same as Example 1.

The physical data on the above blends are as follows:

| Sample No. | Izod ft. lbs./in. | HDT, °C. | Melt flow, at 180°, gms./10 min. |
|---|---|---|---|
| 1399-1 | 0.6 | 72 | 21 |
| 1399-2 | 0.6 | 70 | 20 |
| 1399-3 | 0.8 | 72.5 | 16 |
| 1399-4 | 0.65 | 70.5 | 11 |
| 1399-5 | 1.2 | 69.5 | 22 |
| 1399-6 | 1.8 | 68.5 | 22 |
| 1399-7 | 1.7 | 67 | 43 |
| 1399-8 | 1.0 | 70.5 | 17 |
| 1399-9 | 1.4 | 70 | 18 |
| 1405-7 | ([1]) | 70.5 | 0.6 |
| 1399-11 | 0.4 | 71 | [2] 0.8 |

[1] Not determined.
[2] Control.

The above data show that the acrylic type processing aids and impact-improvers have either a melt-flow depressing effect or they depress HDT, or both. The use of only 3 PHR of polypropylene produces highest melt flow values and maximized HDT whereas the combination of 3 PHR of the polypropylene with 5 or 10 PHR of the other additives is considerably poorer, especially in respects of HDT.

EXAMPLE 5

The effects of amorphous polypropylene on the melt flow behavior of vinyl chloride copolymer base resins is illustrated in this example with respect to vinyl chloride/propylene copolymers containing about 4 percent/weight of combined propylene. Several sets of blends are prepared in duplicate on an equivalent vinyl chloride/propylene basis employing on the one hand vinyl chloride/propylene copolymers and on the other polyvinyl chloride. All of the propylene moieties are incorporated by polymerization, i.e. either by true copolymerization with vinyl chloride or by polymerization of the latter in the presence of polypropylene.

Several vinyl chloride/propylene copolymers are prepared employing the general recipe as follows:

| Material | Parts/Vol. Parts/Wt. |
|---|---|
| Water | 900 ml. |
| K$_3$PO$_4$ | 0.2 gram |
| Polyvinyl alcohol (2%/wt. in H$_2$O) | 40 ml. |
| Polypropylene } Premix | 0 or 40 grams |
| Vinyl Chloride } | 222 grams |
| Propylene | 30 grams |
| Isopropyl peroxy-dicarbonate (10% Sol. in Methanol) | 2 ml. |
| Reaction Temperature | 50° C. |
| Reaction Time | Ca 17 hours |

In one such polymerization employing polypropylene, a yield of 285 grams of resinous product (identified as "No.840'") containing about 14 percent/weight of polypropylene is obtained. Such product evidences a density at 25° C. of 1.276 grams/cc. and an apparent inherent viscosity of 0.646 dl./gram. A similar product ("No.838") made in a similar fashion but at lower conversion and containing 20.4 percent of polypropylene and having a density of 1.2217 is dissolved in tetrahydrofuran, the resulting solution filtered through Fuller's earth and hexane added selectively to precipitate the vinyl chloride resin while leaving the polypropylene in solution. Analysis of the precipitated resin indicated a density of 1.366 grams/cc. which corresponds to about 5.95 mole percent or about 4.07 percent/weight of combined propylene. The data given below represents blends made by milling for 4 minutes by the procedure indicated in previous examples at a listed temperature in the range of 330° to 390° F. Some of the data represents blends containing mill-mixed blends of amorphous polypropylene (same as example 1) with a commercially available polyvinyl chloride known as "Geon 106EP" made by B. F. Goodrich Chemical Company, which polyvinyl chloride is selected for its similarity in molecular weight to that of the described copolymers as shown by an inherent viscosity in the range of 0.65 to 0.68 dl./gram. The data are as follows:

| Sample No. | Properties | | | | | | |
|---|---|---|---|---|---|---|---|
| | Mill temp. °F. | Melt flow [1] | Melt flow [2] | HDT °C. | Tensile-yield | P.s.i. break | Percent elong. |
| 842-1 | 330 | 7.0 | 18 | 64 | 6390 | 5650 | 218 |
| 842-2 | 330 | 19 | 34 | 64.5 | | 5790 | |
| 842-3 | 340 | 40 | 67 | 65 | 5900 | 5760 | 113 |
| 842-4 | 350 | 62 | | 65 | 5830 | 4980 | 80 |
| 842-5 | 350 | 80 | | 64.5 | | 5600 | |
| 842-6 | 390 | 80 | | 65 | 5500 | 5310 | 205 |
| 842-7 | 390 | 125 | | 64 | 5660 | 4770 | 150 |
| 842-8 | 390 | 180 | | 64.5 | | 5220 | |
| 842-9 | [3] 390 | 5.0 | | 65 | 7160 | 5290 | 69 |
| 842-10 | 390 | 21 | | 68 | 6270 | 5790 | 192 |
| 842-11 | 390 | 60 | | 67 | 5860 | 5780 | 205 |
| 842-12 | [3] 350 | 1.6 | | 69 | 7000 | 6380 | 173 |

[1] Melt flow rate at 165° C.
[2] Melt flow rate at 180° C.
[3] Control.

| Sample No. | No. 218 [2] | No. 840 | No. 838 | "Geon 106" | Polypropylene |
|---|---|---|---|---|---|
| 842-1 | 93.85 | 7.15 | | | 1 |
| 842-2 | 87.70 | 14.30 | | | 2 |
| 842-3 | 81.55 | 21.45 | | | 3 |
| 842-4 | 75.40 | 28.60 | | | 4 |
| 842-5 | 69.25 | 35.75 | | | 5 |
| 842-6 | 63.10 | 42.90 | | | 6 |
| 842-7 | 56.95 | 50.05 | | | 7 |
| 842-8 | 50.80 | 57.20 | | | 8 |
| 842-9 | [3] 100 | | | | 0 |
| 842-10 | | | 19.6 | 84.4 | 4 |
| 842-11 | | | 29.4 | 76.6 | 6 |
| 842-12 | ([3]) | | | 100 | 0 |

[1] Each blend also contains 2 PHR dibutyl tin dithioglycollate plus 1 PHR calcium stearate.
[2] Copolymer similar to Nos. 838 and 840 having inherent viscosity (product) of 0.633 and a combined propylene content of 4.2% wt.
[3] Control.

It should be noted that the HDT values of the composition containing polypropylene are essentially unchanged over those of each respective control composition and this result is shown over an extremely wide range of polypropylene levels of 0 to 8 PHR (0 to eight percent/weight based on the vinyl chloride resin). Note also that the improvement in melt flow of the composition based on polyvinyl chloride is proportionately greater than in the compositions based on copolymer resins. Also, the polyvinyl chloride based blends have a slightly higher HDT even though based on a resin of quite modest molecular weight. Another interesting and valuable result shown in the above data is very high melt flow imparted to polyvinyl chloride by minor addition of vinyl chloride-propylene/polypropylene product No. 838. Finally, it should be observed that only one sample (842-7, containing about 4 percent/weight of combined propylene and 7 percent/weight of polypropylene) showed a significant decrease in tensile strength. Data similar to the latter indicates that a level of not above about 6 percent/weight of polypropylene is to be preferred in the blends of this invention.

I claim:
1. A rigid, thermoplastic resinous composition characterized by high melt flow behavior comprising:
   as ingredient (1) a vinyl chloride resin prepared by polymerization of a mono-vinylidene monomeric material containing at least 90 percent/weight of vinyl chloride and
   as ingredient (2) an amorphous polypropylene containing not more than about 30 percent/weight of crystalline structure and having a weight average molecular weight in the range of from about 15,000 to about 40,000, a softening point in the range of from about 70° to about 95° C., and a brittle point not above about 0° C., and
   said composition containing for every 100 parts/wt. of said ingredient (1) from about 0.5 to about 8 parts/wt. of said ingredient (2) and there being no grafting between said ingredients (1) and (2) said monomeric material of ingredient (1) having ingredient (2) dissolved therein during the polymerization.
2. The composition as defined in claim 1 and further characterized by said ingredient (1) being a polyvinyl chloride and there are present in said composition from about 1 to about 6 parts/wt. of said ingredient (2) for every 100 parts/wt. of said ingredient (1) and not more than about 4 parts/wt. for every 100 parts/wt. of said polyvinyl chloride of polymeric impact-improvers and processing aids selected from the class consisting of acrylonitrile/styrene copolymers, acrylonitrile/styrene/butadiene terpolymers, and acrylonitrile/styrene copolymer grafts on polybutadiene.
3. The composition as defined in claim 1 and further characterized by said ingredient (1) being a copolymer of vinyl chloride and propylene containing from about 1 percent to about 7 percent/weight of combined propylene and there are present in said composition from about 1 to about 6 parts/wt. of said ingredient (2) for every 100 parts/wt. of said ingredient (1).
4. A composition as defined in claim 1 and further characterized by a fully fused and intimately intermingled condition induced by high shear, high temperature, mechanical mixing in the range of from about 325° to about 420° F.
5. The method which comprises
   1. dissolving an amorphous polypropylene in a monomeric material consisting of at least 90 percent/weight of monomeric vinyl chloride and not more than 10 percent/weight of other monomeric mono-vinylidene compounds copolymerizable with vinyl chloride, said solution containing from about 0.5 to about 25 percent/weight of dissolved polypropylene, said amorphous polypropylene containing not more than about 30 percent/weight of crystalline structure, having a weight average molecular weight in the range of from about 15,000 to about 40,000, a softening point in the range of from about 70° to 95° C. and a brittle point not above about 0° C.,
   2. effecting polymerization of the monomeric materials in said monomeric mixture in aqueous suspension at a temperature of from about 0° to about 75° C. thereby to produce an aqueous suspension of a macrogranular vinyl chloride resin containing polypropylene exhibiting no grafting between the two and recovering said resin, and
   3. effecting fusion and fluxing of said resin by mechanical mixing under high shear and at a temperature of from about 325° to about 420° F.
6. The method as defined in claim 5 and further characterized by said monomeric material consists of vinyl chloride and the said recovered resin is diluted with a similar vinyl chloride resin not containing polypropylene prior to step 3 in order to produce a fused composition containing from about 1 percent to about 6 percent/wt. of said polypropylene.
7. The method as defined in claim 5 and further characterized by said monomeric material consisting of from about 90 to about 99 percent/wt. of vinyl chloride and about 1 to about 10 percent/wt. of monomeric propylene and the said recovered resin is diluted by addition of a similar vinyl chloride resin not containing polypropylene prior to step (3) in order to produce a fused composition containing from about 1 percent to about 4 percent/wt. of said polypropylene.

* * * * *

PO-1050
(5/69)

UNITED STATES PATENT OFFICE
CERTIFICATE OF CORRECTION

Patent No. 3,626,028          Dated December 7, 1971

Inventor(s) Elmer J. DeWitt

It is certified that error appears in the above-identified patent and that said Letters Patent are hereby corrected as shown below:

Column 1, line 19 delete first "chemical".

Column 3, line 73 delete "about 4,500) and a wide distribution (weight average molecular weight below about 40,000 number average molecular weight below about 4,500) and a wide dis-" and insert therefore --weight (weight average molecular weight below about 40,000; number average molecular weight below about 4500) and a wide distribution in molecular weight--.

Column 4, line 1 delete "tribution in molecular weight".

Column 6, line 75, the footnote "3" is not clear.

Signed and sealed this 18th day of July 1972.

(SEAL)
Attest:

EDWARD M. FLETCHER, JR.
Attesting Officer

ROBERT GOTTSCHALK
Commissioner of Patents